Jan. 14, 1941.   F. JOHANNSEN   2,228,702
PRODUCTION OF LUMPED WROUGHT IRON
Filed June 3, 1939
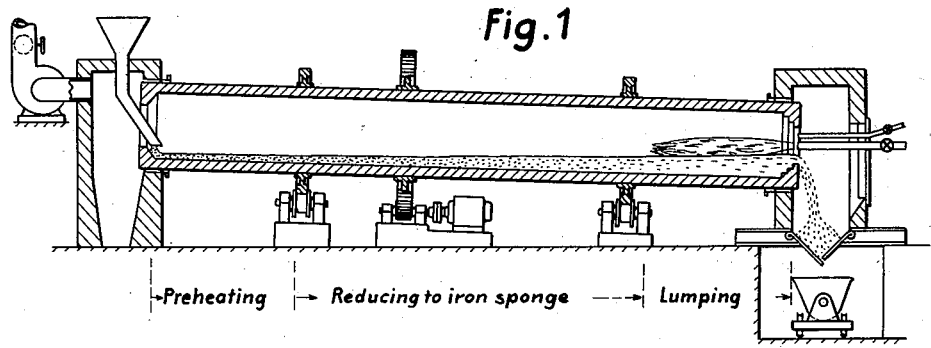
*Fig.1*
Preheating — Reducing to iron sponge — Lumping
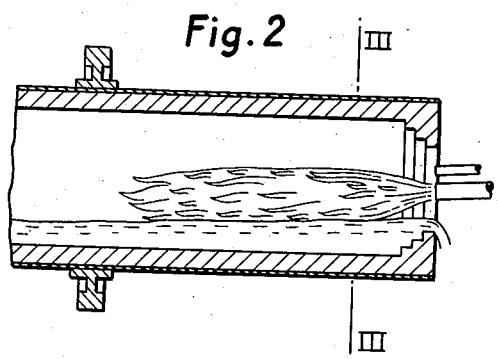
*Fig.2*
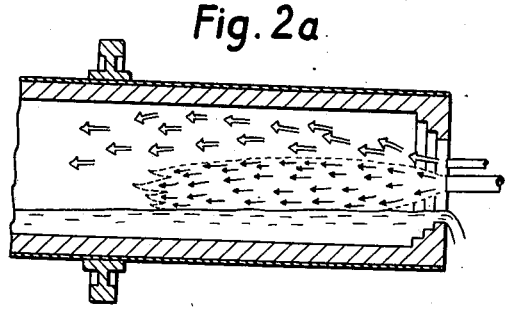
*Fig.2a*
*Fig.3*
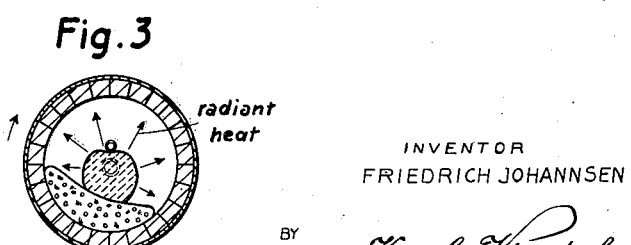
radiant heat
INVENTOR
FRIEDRICH JOHANNSEN
BY  *Karl Viertel*
ATTORNEY Patented Jan. 14, 1941

2,228,702

UNITED STATES PATENT OFFICE 2,228,702

PRODUCTION OF LUMPED WROUGHT IRON

Friedrich Johannsen, Magdeburg, Germany, assignor to Fried. Krupp, Grusonwerk, Aktien-Gesellschaft, Magdeburg-Buckau, Germany Application June 3, 1939, Serial No. 277,313
In Germany June 1, 1938

1 Claim. (Cl. 75—32)

My invention relates to the problem of directly producing wrought iron from ferriferous minerals and metallurgical products, and more especially to improvements in a process of directly and continuously producing lumped wrought iron in a metallurgical furnace from ferriferous minerals and metallurgical products, including crude ore, purple ores, slags, as described in a prior United States patent of mine No. 1,964,917 of July 3, 1934, hereinafter referred to as the "old" process.

The objects of this invention and the advantages obtained by the proposed improvements will be better understood by critically reviewing the old process and gathering the reasons why the old process was unsatisfactory from economical points of view.

The old process of directly producing lumped wrought iron is carried out in practice preferably in a rotary metallurgical furnace of tubular design and essentially comprises the following steps: Causing a charge of ferriferous material, which is mixed with carbonaceous reducing agents, for instance fuel in the form of ground coke, to pass through the heated furnace so as to be converted at temperatures ranging in practice from 600° to 900° centigrade into iron sponge, causing a current of oxidizing gases to react with the heated charge, so as to oxidize, i. e., burn a portion of iron of the sponge and produce additional heat ranging in practice from 900° to 1400° centigrade, sufficient for starting and accomplishing the lumping of the iron of the sponge and for producing from the iron oxides and the slag forming constituents of the ore, which are fluxible by iron-oxide, slags rich in iron oxides and sufficiently liquid as to flow out of the lumping iron, causing iron oxides of said slags to be reconverted into lumped wrought iron, by so determining the quantity of fuel added to the charge, that a sufficient proportion of unconsumed fuel is still present in the charge on passing through the lumping zone and to the exit of the furnace, for reducing in one and the same cycle of reactions iron oxides of said slags, and causing said slags and lumped iron embedded therein to flow from the furnace.

Continued practical experiments of mine and other efforts directed to carrying out the old process described under conditions of strictest economy, viz. with the object of economizing in the consumption of fuel and reclaiming the greatest possible proportion of iron from the raw material under treatment and in the shortest possible time have revealed, that certain procedures and features characteristic of the old process were unsatisfactory.

On analyzing the exhaust gases of the furnace it was found, that the latter contained a considerable percentage of carbon monoxide, a fact which showed, that an excessive proportion of the oxidizing gases fed into the furnace had been prematurely consumed in the lumping zone, and that an inadequate quantity of oxygen had reached the reduction zone of the furnace, wherein a large proportion of the fuel of the charge should have been burned and should have highly preheated the iron sponge produced prior to its entering the lumping zone.

The lumping of the iron was likewise impaired, accompanied by a drop of the temperature in the lumping zone, when more air was blown into the furnace with the object of supplying more oxygen to the reduction zone for the combustion of the carbon monoxide, and even on applying additional heat, usually by means of a rather voluminous and cloudy flame produced by generator gas, and occupying substantially the whole cross sectional free space of the furnace, it required great skill on the part of the operators of the plant to restore normal working conditions in the furnace, because the over-all temperatures of said voluminous flame and prevailing in the lumping zone were considerably lowered by the air blown into the furnace, and because a considerable proportion of the oxygen supplied with the additional air was incidentally consumed before reaching the reduction zone.

Briefly stated a vicious circle of antagonistic factors, heating versus cooling, occured in the furnace, besides an obvious waste of fuel, lost with the escaping carbon monoxide, which impaired the working efficiency and output of the furnace.

The principal object of this invention is to avoid the said vicious circle and to establish economical working conditions in the furnace; namely the invention aims at improving the old lumping process so that the production of ample heat in the lumping zone as required for the proper lumping of the iron of the charge is ensured, more especially in emergency cases, for instance on dealing with troublesome ores, when additional heat is required.

In connection therewith the invention aims at ensuring an ample supply of oxidizing gases into the reduction zone as required for the combustion of the carbon monoxide produced and for adequately preheating the charge for the lumping process proper.

Other objects of the invention will become incidentally apparent to practitioners in this field as the description proceeds.

The nature and scope of the invention are briefly outlined in the appended claim and will be more fully understood from the following specification taken together with the accompanying drawing, in which—

Fig. 1 is a longitudinal section through a rotary tubular furnace as preferably used for carrying out in practice the improved lumping process, Figs. 2 and 2a are fragmentary sections through the furnace drawn on a larger scale and showing a luminous heat radiating flame as applied according to this invention in the lumping zone, Fig. 3 is a cross section vertically taken through the furnace on line III—III in Fig. 2.

The inventor's research work has revealed that it has been proposed to supply relatively large quantities of air right into the inner section of a rotary tubular furnace where they are needed for reaction with the material under treatment—

(1) By throwing a jet of highly compressed air into the furnace by means of a blower and a tube longitudinally extending into the furnace, as seen from German Patent 628,571 to Fried. Krupp, Grusonwerk, Aktien-Gesellschaft, and (2) By attaching an electrically driven blower to the furnace so as to rotate therewith and by fitting the latter with an angularly shaped tube radially extending into the furnace, through which the air is blown thereinto, as seen from British Patent 491,921 to Basset, a French inventor.

In contradistinction thereto and with the object of avoiding the above described drawbacks encountered in practice in the "old" lumping process disclosed in my United States Patent 1,964,917, more especially when by chance troublesome ores of doubtful origin have to be dealt with, it is proposed according to this invention to apply to the charge additional heat in a specific manner, namely by blowing a concentrated, luminous flame into the furnace at the discharge end along the upper surface of the charge so as to impinge thereon, and by so proportioning the said luminous flame as to its cross sectional size relatively to the inner clear width of the furnace, that a current of oxidizing gases entering at the discharge end of the furnace will cleanly pass above and past said luminous flame into the reducing zone without impairing the lumping process.

Extensive practical experiments carried out by the inventor with a furnace of 3.1 m. internal diameter, and 50 m. in length have shown, that the best results were obtainable with a luminous flame as specified of about 0.7 to 0.9 m. diameter and being produced by crude oil or powdered dry coal, the volatile constituents of which did not exceed 20 to 22%.

Summarizing the above statements: The problem at issue is solved through the expedient or trick of introducing radiant heat into the furnace in the form of a concentrated, luminous flame, so proportioned as to its diameter, that a current of oxydizing gases as required for the chemical reactions in the inner sections or zones of the furnace, designated in Fig. 1 "reducing to iron sponge" and "preheating," can freely pass thereinto, without curtailing the lumping process.

What I claim is:

Process of producing wrought iron, which comprises causing a charge of ferriferous material mixed with carbonaceous fuel to pass through a metallurgical furnace, agitating and pre-heating the charge therein up to temperatures, at which the iron compounds of the charge are converted into sponge iron, causing the charge to be further heated up to temperatures at which the sponge iron is converted into lumped iron and the gangues are converted into slags flowing from the furnace, while so determining the quantity of carbonaceous fuel added to the charge, that a proportion of unconsumed fuel is still present in the charge on passing to the exit of the furnace, sufficient to reduce in one and the same cycle of reactions iron oxides of said slags produced during the lumping process, blowing a concentrated, luminous flame into the furnace from its exit along the upper surface of the charge, so as to impinge thereon, said flame being substantially smaller in cross-sectional size than the inner clear width of the furnace, and passing a current of oxidizing gases into and through the furnace from its exit above and past said luminous flame.

FRIEDRICH JOHANNSEN.